(12) United States Patent
Verghade et al.

(10) Patent No.: US 9,249,936 B2
(45) Date of Patent: Feb. 2, 2016

(54) MODULAR ELEMENT FOR DISTRIBUTING PRESSURIZED GAS AND CORRESPONDING INSTALLATION

(71) Applicant: L'Air Liquide, Societe Anonyme pour l'Etude et Exploitation des Procedes Georges Claude, Paris (FR)

(72) Inventors: Jen-Marie Verghade, Saint Martin d'Uriage (FR); Guillaume Roberge, Maubec (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 263 days.

(21) Appl. No.: 13/743,637

(22) Filed: Jan. 17, 2013

(65) Prior Publication Data
US 2014/0026991 A1     Jan. 30, 2014

(30) Foreign Application Priority Data
Jan. 17, 2012   (FR) ...................................... 12 50452

(51) Int. Cl.
*H01M 8/04*   (2006.01)
*H01M 8/24*   (2006.01)
(Continued)

(52) U.S. Cl.
CPC ................ *F17D 1/04* (2013.01); *F17C 13/084* (2013.01); *F17C 2201/056* (2013.01);
(Continued)

(58) Field of Classification Search
CPC ................... H01M 8/04201; F17C 2201/056; F17C 2201/58; F17C 2205/0111; F17C 2205/0126; F17C 2205/0142; F17C 2205/0146; F17C 2205/0326; F17C 2205/0332; F17C 2205/0338; F17C 2205/0355; F17C 2205/037
USPC ........................................ 429/462; 137/561 A
See application file for complete search history.

(56) References Cited

U.S. PATENT DOCUMENTS

2004/0221819 A1 * 11/2004 Aoyagi et al. ..................... 123/3
2007/0240770 A1 * 10/2007 Yamashita et al. ....... 137/505.14
(Continued)

FOREIGN PATENT DOCUMENTS

DE          201 03 682          5/2001
DE       20 2009 010571       12/2010
(Continued)

OTHER PUBLICATIONS

French Search Report and Opinion for FR 1 250 452, mailed Nov. 8, 2012.

*Primary Examiner* — Sean P Cullen
(74) *Attorney, Agent, or Firm* — Christopher J. Cronin (57) ABSTRACT

A modular element for distributing pressurized gas comprising a housing containing at least one tank of pressurized gas, the at least one tank having an outlet orifice coupled, via a pressure reducing valve, to a gas distribution circuit, characterized in that the modular element includes a cover for the housing, the cover selectively closing an open face of the housing and forming a support for a first gas duct and a second gas duct forming at least part of the gas distribution circuit, the first gas duct having a first free extremity and a second free extremity each fitted with a fluid coupling member, the second gas duct having a first free extremity fitted with a fluid coupling member coupled in a selectively removable manner to an inlet receiving expanded gas from the reducing valve of the at least one tank and a second extremity coupled to the first duct, between the two extremities of said first duct.

15 Claims, 9 Drawing Sheets

(51) Int. Cl.
  *F01D 1/04*  (2006.01)
  *F17D 1/04*  (2006.01)
  *F17C 13/08*  (2006.01)

(52) U.S. Cl.
  CPC .. *F17C 2201/058* (2013.01); *F17C 2205/0111* (2013.01); *F17C 2205/0126* (2013.01); *F17C 2205/0142* (2013.01); *F17C 2205/0146* (2013.01); *F17C 2205/037* (2013.01); *F17C 2205/0326* (2013.01); *F17C 2205/0332* (2013.01); *F17C 2205/0338* (2013.01); *F17C 2205/0355* (2013.01); *F17C 2221/012* (2013.01); *F17C 2223/0123* (2013.01); *F17C 2223/036* (2013.01); *F17C 2227/046* (2013.01); *F17C 2250/032* (2013.01); *F17C 2250/038* (2013.01); *F17C 2250/043* (2013.01); *F17C 2260/038* (2013.01); *F17C 2265/066* (2013.01); *Y02E 60/321* (2013.01); *Y02E 60/34* (2013.01); *Y10T 137/85938* (2015.04)

(56) References Cited

U.S. PATENT DOCUMENTS

2009/0000842 A1*  1/2009  Hwang et al. ............... 180/68.5
2009/0064764 A1*  3/2009  Kizaki et al. ............... 73/40.5 R
2010/0276024 A1*  11/2010 Iida et al. .................... 137/899

FOREIGN PATENT DOCUMENTS

| | | |
|---|---|---|
| EG | GB 2 007 348 | 5/1979 |
| EP | 1 988 327 | 11/2008 |
| FR | 2 868 160 | 9/2005 |
| FR | 2 957 806 | 9/2011 |
| GB | 2 467 170 | 7/2010 |
| WO | WO 2010 107 317 | 9/2010 |

* cited by examiner

MODULAR ELEMENT FOR DISTRIBUTING PRESSURIZED GAS AND CORRESPONDING INSTALLATION

CROSS-REFERENCE TO RELATED APPLICATIONS

This application claims the benefit of priority under 35 U.S.C. §119 (a) and (b) to French Patent Application No. 1250452, filed Jan. 17, 2012, the entire contents of which are incorporated herein by reference.

BACKGROUND

1. Field of the Invention

The present invention relates to a modular element for distributing pressurized gas as well as a corresponding installation.

More specifically, the invention concerns a modular element for distributing pressurized gas comprising a housing containing at least one tank of pressurized gas, the at least one tank having an outlet orifice coupled, via a pressure reducing valve, to a gas distribution circuit.

The invention particularly concerns the ducting of gas between high-pressure gas tanks (usually racks of hydrogen cylinders at 200 or 700 bar) and an application using this gas at low pressure (for example a fuel cell using the gas at 300 mbar).

2. Related Art

Known gas distribution elements currently use switchover systems that transferred gas from several cylinder racks to the application.

However, these known systems are poorly adapted to isolated sites lacking prepared infrastructure, i.e. sites where it is either not desirable (temporary installation, land to be restored to original condition) or not possible (too costly in budget or too time-consuming in schedule) to build such infrastructure.

Furthermore, the known systems are relatively complex to install and difficult to adapt to different gas usage configurations.

SUMMARY OF THE INVENTION

One objective of this invention is to mitigate some or all of the drawbacks of the prior art as set out above.

For this purpose, the modular element according to the invention, in addition to coinciding with the generic definition given in the preamble above, is essentially characterized in that the modular element includes a cover for the housing, the cover selectively closing an open face of the housing and forming a support for a first gas duct and a second gas duct forming at least part of the gas distribution circuit, the first gas duct having a first free extremity and a second free extremity each fitted with a fluid coupling member, the second gas duct having a first free extremity fitted with a fluid coupling member coupled in a selectively removable manner to an inlet receiving expanded gas from the reducing valve of the at least one tank and a second extremity coupled to the first duct, between the two extremities of said first duct.

Such a modular element is simple to install using few or no tools.

This modular element can be adapted to sites with no infrastructure such as a slab or a wall.

The structure of such a modular element makes it easy to create a flexible network for handling misalignments of network elements.

This element makes it possible to adapt the number of tanks, which varies between installations and even within a single installation, depending on the time of year (for example, as a function of usage linked to temperature variations).

Furthermore, the embodiments of the invention may have one or more of the following features:
- at least one of the first extremity of the first duct, the second extremity of the first duct and the first extremity of the second duct is flexible to enable a fluid coupling in different positions and over different gaps in relation to the cover,
- the first extremity of the first duct includes a male or, respectively, female self-sealing quick-coupling member, the second extremity of the first duct including a female or, respectively, male self-sealing quick-coupling member, mating with the coupling member of the first extremity, to enable the coupling of a first extremity of the first duct of a first cover to the second extremity of the first duct of a cover of a different modular element,
- the second extremity of the first duct is flexible and is seated in a rigid protective sheath that is assembled movably in relation to the cover,
- the cover has a third duct having a first free extremity including a fluid coupling member and a second extremity coupled fluidically between the first and second extremities of the first duct,
- the outlet orifice of the tank or tanks is linked to an isolating valve arranged in series with the pressure reducing valve, the pressure reducing valve being designed such as to ensure a pressure drop between the high pressure of the tank and a predetermined fixed or adjustable lower pressure, preferably between 5 and 25 bar,
- the isolating valve and the pressure reducing valve are seated in a tap common to the tank or tanks of the housing, the low-pressure outlet of the tap downstream of the pressure reducing valve including a fluid coupling member selectively coupled to the first extremity of the second gas duct,
- the second gas duct includes an isolating valve arranged between the first and second extremities thereof and a pressure sensor placed between the first extremity of the duct and said isolating valve,
- the cover includes an electronic control logic linked to the pressure sensor of the second duct, the control logic also including an electrical cable linked to the first extremity of the second duct and fitted with a sensor to determine the coupled or uncoupled state of this first extremity of the second duct, the electronic logic being configured to selectively perform a leakage test in which the isolating valve of the second duct is closed, the isolating valve associated to the tank or tanks is opened and the pressure measured by the pressure sensor of the second duct is compared to a predetermined threshold,
- the isolating valve of the second duct is a solenoid valve, the electronic logic being linked to this solenoid valve via an electrical cable to enable the opening or closing thereof to be controlled selectively,
- the modular element includes a pressure sensor measuring the pressure in the tank upstream of the pressure reducing valve,
- the pressure sensor or sensors are associated to an electronic logic comprising a device for the remote transmission of pressure data measured and possibly a memory storing this data,
- the electronic logic includes at least one additional electrical cable having a free extremity fitted with an electrical coupling for a selective coupling to an external electronic member such as an electronic logic of another adjacent modular element, the cover includes visual and/or audible warning devices to flag operating failures such as a leak detected by the electronic logic, and/or to inform the user of the need to perform an operation (change tank, for example).

The invention also relates to a fuel cell installation comprising a fuel cell coupled to a source of gas fuel containing hydrogen, the source of gas fuel having at least one modular element for distributing gas according to any one of the features above or below, in which the at least one pressurized gas tank contains the pressurized fuel gas and the second extremity of the first gas duct is coupled fluidically to a gas inlet of the fuel cell.

According to a possible feature, the installation includes several modular elements coupled in line to supply the fuel cell, the first extremity of the first duct of a first module being coupled to the second extremity of the first duct of a second adjacent module such that the tanks of the adjacent modules are linked in parallel to a shared supply line formed by the first gas ducts linked.

Such an installation makes it possible to change one cylinder rack only (one modular element) without having to stop distribution.

Where required, such an installation makes it possible to change two stacked modular elements only without having to stop distribution.

Such an installation makes it possible to create a network of tanks in parallel that can be emptied sequentially or simultaneously as required. Equally, such an installation makes it possible to keep a modular element in reserve (that is emptied of gas last, after the other modular elements).

Such an installation forms a bus-configuration gas network (i.e. with shared circuitry) that is flexible and secure, linking gas sources to the system using the gas.

This gas distribution network does not require any infrastructure, but it may be secured in terms of restricting access and protection levels, which is useful when rolling out installations at isolated or temporary sites.

This secure network installation may also apply to wired communication networks, actuator controls and measurement sensors, between subsystems (modular elements) of the installation.

According to a possible feature, the modular elements are placed on the ground on the respective housing thereof and the first extremity and/or the second extremity of the first duct of each modular element is flexible and/or extendable to enable different orientations, inclines and heights between the fluidically coupled adjacent modular elements (1).

BRIEF DESCRIPTION OF THE FIGURES

The invention may also relate to any alternative device or method including any combination of the features set out above or below.

Other features and benefits are set out in the description below, provided with reference to the figures in which.

DETAILED DESCRIPTION OF THE INVENTION

Figure 1:
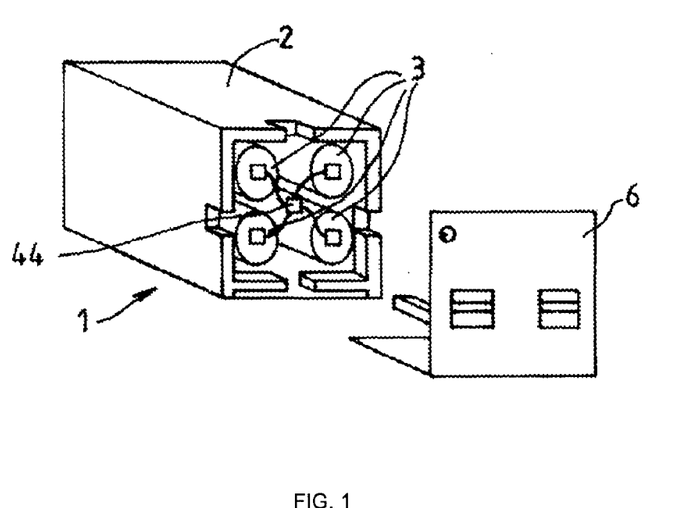
FIG. 1 is a schematic partial perspective view of a possible example embodiment of a modular element for distributing gas according to the invention in open position.

With reference to FIG. 1, the modular element 1 for distributing pressurized gas includes a housing 2 that is for example a parallelepiped. The housing 2 contains at least one pressurized gas tank 3. In the non-limiting example shown, there are four tanks 3 (cylinders) of pressurized fuel gas such as hydrogen.

Each of the tanks 3 has an outlet orifice (which may also be used to fill the tank) coupled, via a shared pressure reducing valve 4, to a gas-distribution circuit 15, 5.

In other words, the gas drawn from each tank 3 is controlled by a tap/reducing valve 44 shared by the tanks 3 of a single housing 2. Naturally, as a variant, each tank 3 may be fitted with its own tap/reducing valve 44. The modular element 1 also includes a removable closing cover 6 for at least part of one face of the housing 2. Preferably, the module is placed on the ground on one face of the housing 2 other than the cover 6.

Preferably, the cover 6 selectively closes an end face of the parallelepipedic housing. For example, the cover 6 is locked selectively to the housing 2 via a male/female closing system. As shown schematically and partially in FIG. 2, and in FIG. 6, an internal face of the cover 6 also forms a mechanical support for a gas-distribution circuit 15, 5 selectively couplable to the tank or tanks 3 (i.e. couplable to a gas outlet of the tap/reducing valve 44).

Figure 2:
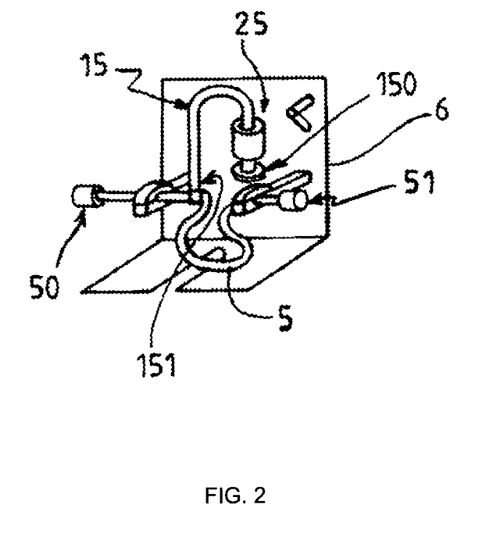
FIG. 2 shows a schematic partial perspective view of a detail of FIG. 1 showing a cover of the modular element.
Figure 6:
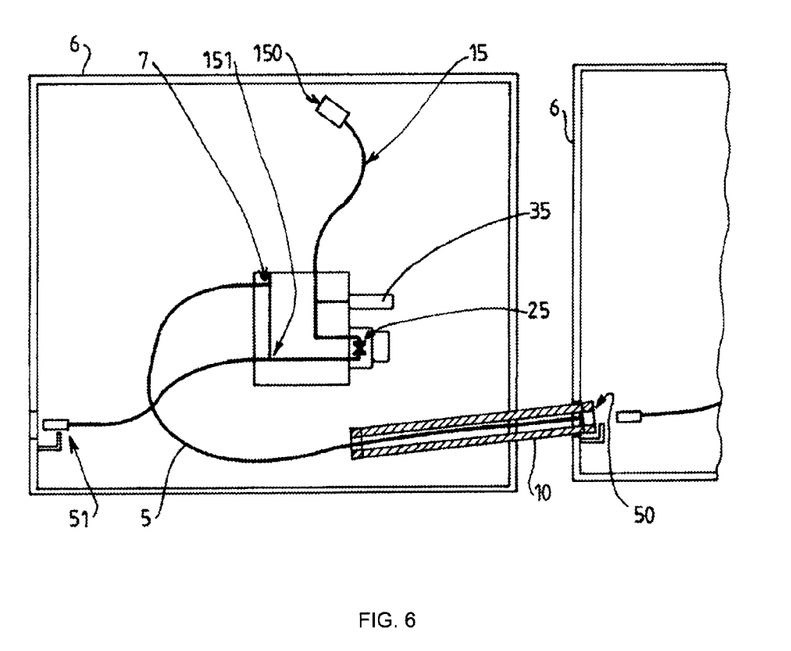
FIG. 6 is a partial schematic view of the internal fluidic structure of a modular-element cover according to a possible embodiment.

The gas-distribution circuit 15, 5 includes a first gas duct 5 and a second gas duct 15. The first gas duct 5 has a first free extremity 51 and the second free extremity 50, each of these two free extremities being fitted with a fluid coupling member such as a quick-coupling member. The second gas duct 15 has a first free extremity 150 fitted with a fluid coupling member coupled in a selectively removable manner to an inlet receiving expanded gas from the tap/reducing valve 44 of the tanks 3 of the housing 2. The second extremity 151 of the second duct 15 is coupled between the two extremities 50, 51 of said first duct 5.

As shown in FIG. 2 and in FIG. 6, the second gas duct 15 may be fitted with an isolating valve 25. This isolating valve 25 may be linked to an adjustable or non-adjustable pressure reducing valve designed to ensure a predetermined pressure drop (i.e. an additional pressure drop if a reducing valve 4 is already provided at the outlet of the tanks 3).

Figure 3:
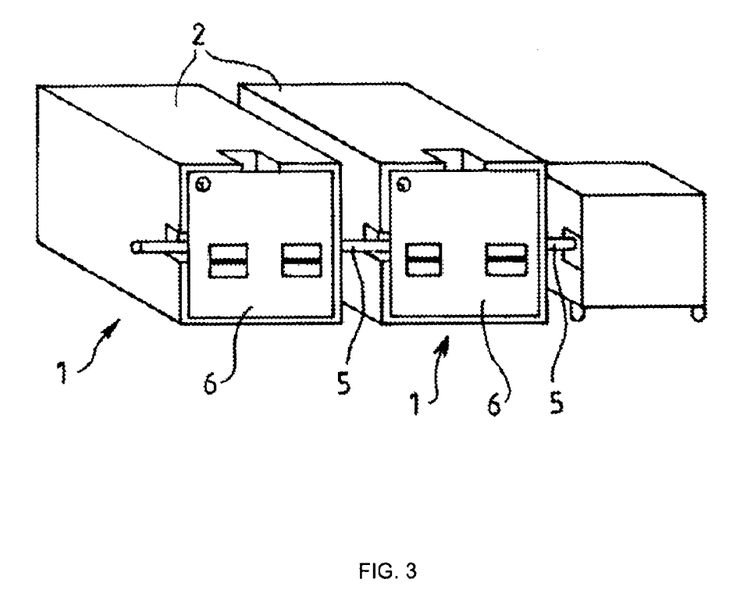
FIG. 3 shows a schematic partial perspective view of an example installation including two modular elements according to FIG. 1 coupled in line to a gas-consuming application.
Figure 8:
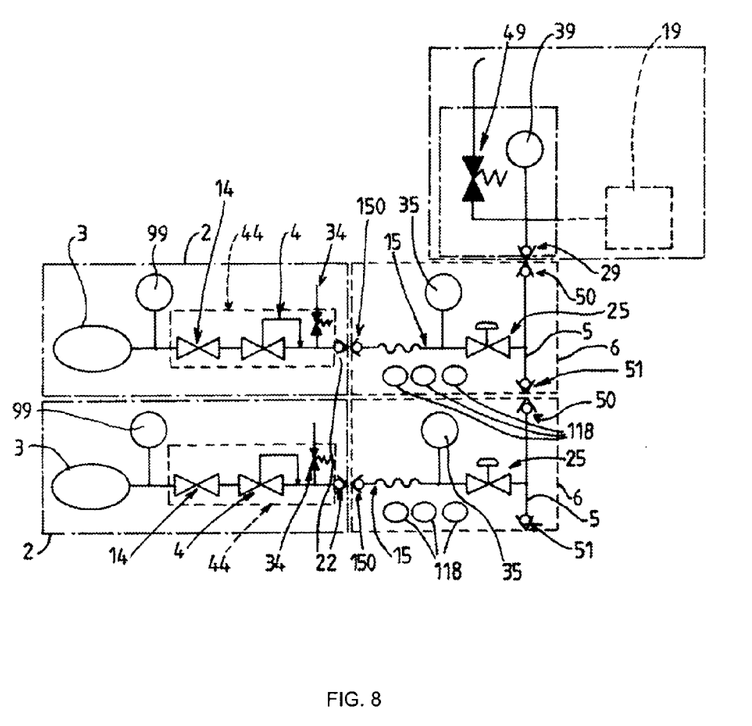
FIG. 8 is a partial schematic view of the fluidic structure of two modular elements coupled to a gas-consuming application according to a possible embodiment.

Such a structure makes it possible to link several modular elements 1 in line, as shown in FIG. 3 and FIGS. 6 and 8.

As shown in FIG. 6, the second extremity 50 of the first duct 5 is flexible and may be seated in a rigid protective sheath 10 that is assembled movably in relation to the cover.

At least one of the following: the first extremity 51 of the first duct 5, the second extremity 50 of the first duct 5 and the first extremity 150 of the second duct 15 is flexible to enable a fluid coupling in different positions and over different gaps in relation to the cover 6.

The first extremity 51 of the first duct 5 preferably includes a male or, respectively, female self-sealing quick-coupling member, and the second extremity 50 of the first duct 5 includes a female or, respectively, male self-sealing quick-coupling member, mating with the coupling member of the first extremity 51. This enables a first extremity 51 of the first duct 5 of a first cover 6 to be coupled to the second extremity 50 of the first duct 5 of a cover 6 of a different modular element 1.

FIG. 8 is a schematic view of the in line link of two modular elements used to supply gas to an application such as a fuel cell 19.

Each modular element includes a housing 2 containing one or more tanks 3 (a single tank is shown schematically in each housing 2 of FIG. 8).

The following is provided in series at the outlet of the tank or tanks 3: a pressure sensor 99 (optional), an isolating valve 14, a pressure reducing valve 4, a safety discharge valve 34. These fluid members are preferably built into a tap/reducing valve 44 provided with an expanded-gas outlet culpable via a fluid coupling 22 such as a quick coupling.

The pressure reducing valve 4 is for example designed such as to ensure a pressure drop between the high pressure of the tank and a predetermined fixed or adjustable lower pressure, preferably between 5 and 25 bar, for example 10 bar.

The coupling 22 is selectively couplable to the first extremity 150 of the second duct 15 of the distribution circuit of the corresponding cover 6. Thus, the low-pressure outlet of the tap (downstream of the reducing valve 4) is coupled selectively to the first extremity 150 of the second gas duct 15.

The second duct 15 may also include a pressure sensor 35 (optional) and isolating valves 25 (optional) between the first extremity 150 and the second extremity 151 thereof (see FIGS. 6 and 8).

The first extremity 51 of the first duct 5 of a first cover is coupled selectively to the second extremity 50 of the first duct 5 of an adjacent cover 6. Thus, the tanks of the adjacent housings 2 are assembled in parallel to supply an application via an inlet coupling 29. The gas inlet coupling 29 of the application is coupled to the second extremity 50 of the first duct 5 of a modular element 1. The application may include a fuel cell 19 placed in a gas circuit fitted with a safety valve 49 and a pressure sensor 39.

Figure 4:
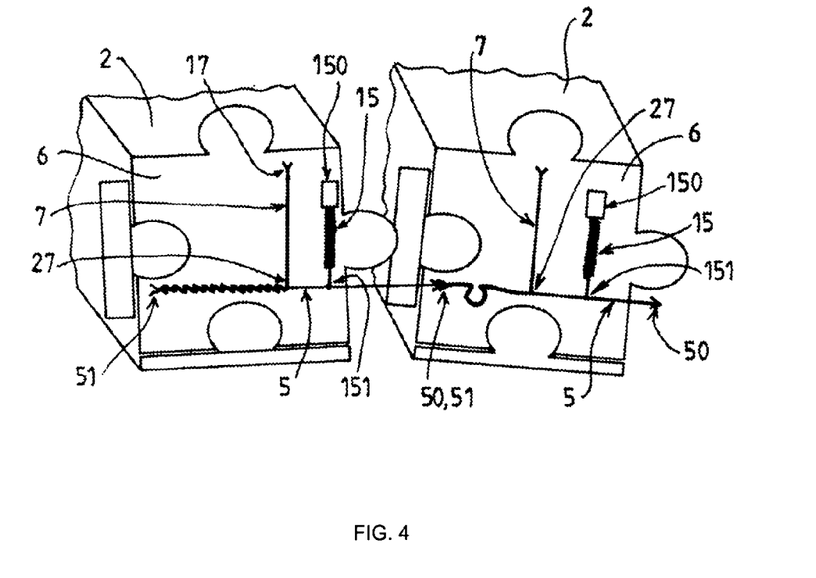
FIG. 4 is a partial schematic view of the possible link between two covers of adjacent modular elements according to a first example embodiment.

FIG. 4 is a schematic view of a fluid coupling between two covers 6 of housings 2 (for the sake of simplicity, the housings 2 and the contents thereof are not shown in full in FIG. 4). In addition to the first gas duct 5 and the second gas duct 15, each cover 6 may optionally have a third duct 7 having a first free extremity 17 including a fluid coupling member and a second extremity 27 coupled fluidically between the first and second extremities 50, 51 of the first duct 5 (FIG. 6 also shows the third duct 7).

The first extremity 51 of the first duct 5 of a first cover is coupled selectively to the second extremity 50 of the first duct 5 of an adjacent cover 6.

Figure 5:
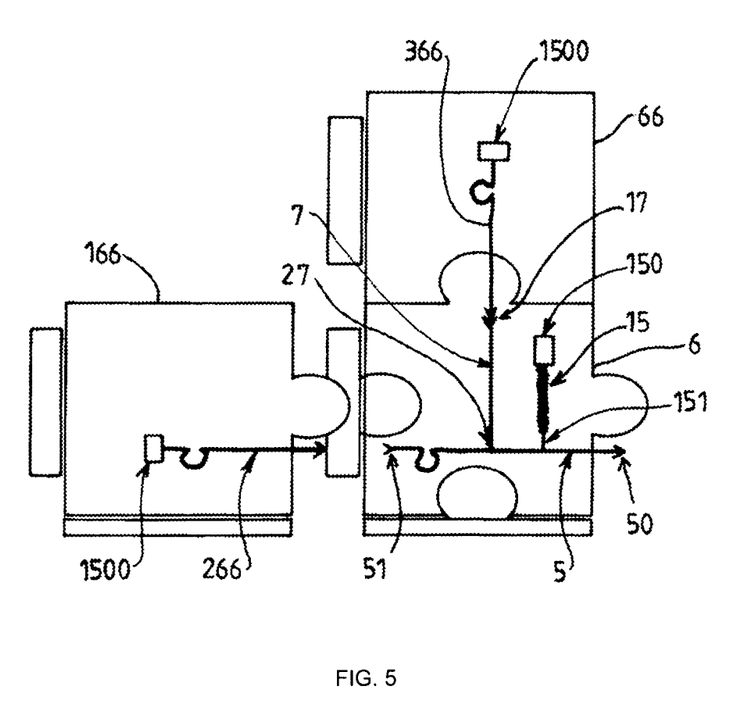
FIG. 5 is a partial schematic view of the possible link between three covers of adjacent modular elements according to a third example embodiment.

As shown in FIG. 5, a cover 6 may be linked to an end part 166 fitted with an end duct 266. The end duct 266 is linked to the first extremity 51 of the first duct 5 of the cover 6 to close up this latter and thereby close one extremity of the gas network so formed. Where applicable, the end duct 266 has a free extremity with a fluid coupling part 1500.

Furthermore, the cover 6 may be associated to an upper part 66 that is placed on the cover 6. This upper part 66 is provided with an end duct 366 that is linked to the first extremity 17 of the third duct 7 of the cover 6 to close up this latter (for example to close this extremity of the gas network so formed). Where applicable, the end duct 366 has a free extremity with a fluid coupling part 1500.

The end part 166 and the upper part 66 may be identical housings including a fluid network simpler than the other modular elements described previously.

The modular element 1 may also advantageously (although not necessarily) include an electronic control logic 11 including for example a microprocessor and/or any other suitable device.

Figure 7:
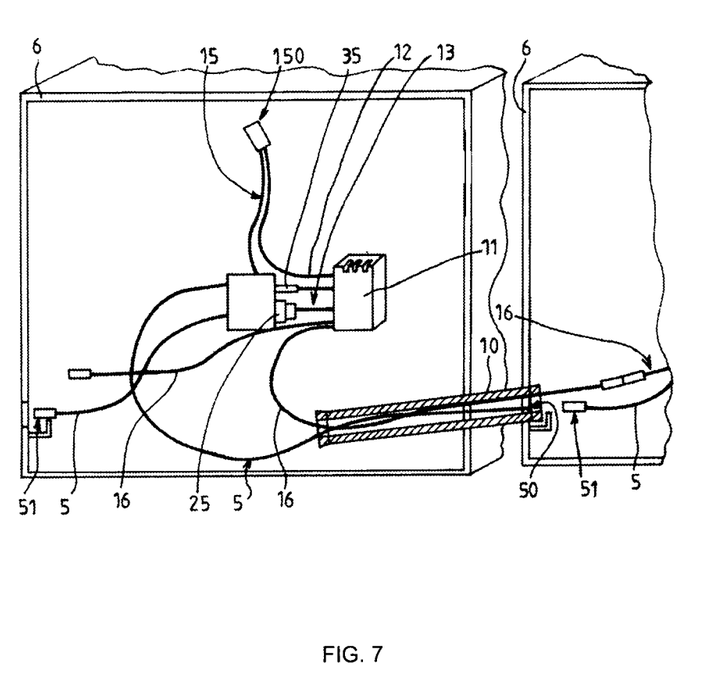
FIG. 7 is a partial schematic view of the internal fluidic and electrical structure of a modular-element cover according to a possible embodiment.

As shown in FIG. 7, the electronic logic 11 is linked to the pressure sensor 35 of the second duct 15. The isolating valve 25 of the second duct 15 is preferably a solenoid valve. The electronic logic 11 is linked to this isolating valve 25 via an electrical cable 13 to enable the opening or closing thereof to be controlled selectively.

The electronic logic 11 also includes one or two cables 16, each having a free extremity fitted with an electrical coupling for a selective coupling to an external electronic member such as an electronic logic of another adjacent modular element 1 (for data transfers and/or electrical power supply).

The electronic logic 11 may also include an electrical cable 12 related to the first extremity 150 of the second duct 15 and fitted with a sensor to determine the coupled or uncoupled state of this first extremity 150 of the second duct 15 (see FIG. 7). The logic 11 may also include a cable for powering and/or controlling an electromagnet in the first extremity 150, this electromagnet controlling for example the isolating valve 14 of a gas tank 3 to which the first extremity 150 is connected.

The electronic logic 11 can be configured (programmed) to selectively perform a leakage test in which the isolating valve 25 of the second duct 15 is closed while the isolating valve 14 associated to the tank or tanks 3 is opened and then closed once the gas line to be tested is sufficiently inflated.

The pressure measured by the pressure sensor 35 of the second duct 15 is then compared to a predetermined threshold of the first extremity 51 of the cover 6. This test makes it possible to detect potential anomalies, in particular leaks if the pressure upstream of the isolating valve 25 of the second duct 15 is abnormally low.

Indeed, opening the isolating valve 14 on the side of the tanks 3 and simultaneously closing the isolating valve 25 of the second duct 15 usually increases the pressure read by the sensor 35 located on the second duct 15. A timer may be provided to monitor this pressure, as well as the variation in this measured pressure, if necessary. When the timer expires, if the pressure is less than a predetermined threshold (as a function of a maximum authorized leakage rate), a leak is detected. Otherwise there is no leak.

During this time, if the variation in the pressure measured is greater than an upper threshold, the leak may be deemed to be too great and the test may be stopped. Equally, a leak is detected if the pressure measured during this time is too low.

By the end of the leakage test, the isolating valve 14 on the side of the tanks 3 has already been closed and the isolating valve 25 of the second duct 15 may be opened.

Depending on the result of the leakage test, either the rack is available and ready for use, or the rack is faulty and therefore unavailable and awaiting the intervention of an operative who can disconnect the head of the tap/reducing valve 44, check the state of the couplings and recouple the coupling to restart a leakage test.

The isolating valve 14 on the side of the tanks 3 can preferably only open:
- during an automatic leakage test, to inflate the line to be tested as described above,
- during normal extraction operation.

The tap/reducing valve 44 may be considered faulty for example if the downstream pressure of the reducing valve 4 is greater than a predetermined threshold, for example 15 bar and only when the upstream isolating valve 14 is open.

The cover 6 may include visual and/or audible warning devices 118 to flag operating failures, such as a leak detected by the electronic logic 11.

Figure 9:
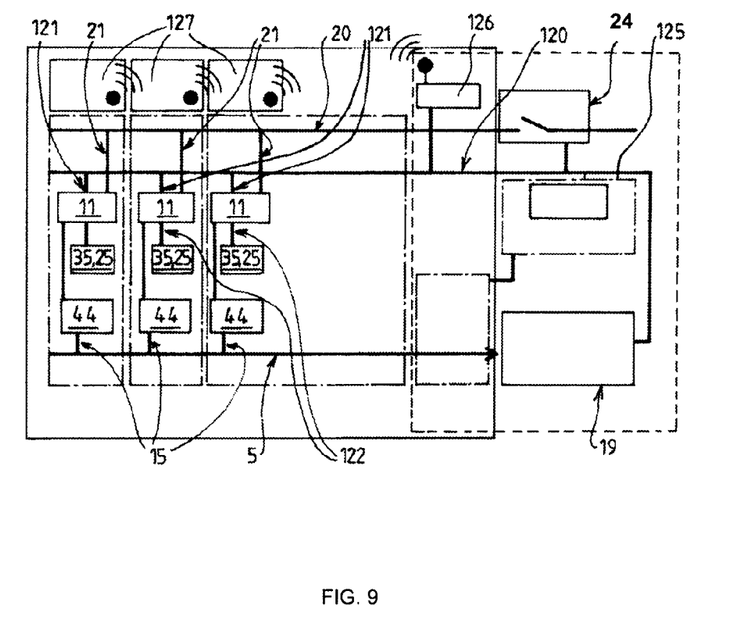
FIG. 9 is a partial schematic view of the structures of the fluid and electrical networks of an installation comprising several modular elements coupled to a gas-consuming application according to a possible embodiment.

FIG. 9 is a schematic view of a possible electrical architecture for the installation comprising three basic modules linked in line. Each module is shown schematically by the respective tap/reducing valve unit 4, 14 thereof, the second gas duct 15 thereof and the first gas duct 5 thereof respectively. The first gas ducts 5 of the three basic modules are linked fluidically in lines. The taps/reducing valves 4, 14 (and therefore the corresponding tanks, not shown for the sake of simplicity in FIG. 9) are therefore linked in parallel to the gas duct formed by the first gas ducts 5. The first gas duct 5 selectively supplies a fuel cell 19.

The fuel cell 19 generates the electricity for an application. Some of this electricity can in turn power the electronic part of the installation. For example, a circuit 20, 21 links, via a switch 24, the fuel cell 19 to the electronic logics 11 of the module element 1 to control the sensors or valves 25, 35. Furthermore, another communication circuit 120, 121, 122 can link a controller 125 to each of the electronic logics 11, to the sensors and to the valves 25, 35 as well as to the taps/reducing valves 4, 14. As shown in FIG. 9, this communication circuit 120 can also be linked to the fuel cell 19. Some or part of the information may be sent remotely via a wireless transmitter 126 (if necessary, this transmitter also receives data). Alternatively or cumulatively, the transmitter 126 retrieves the information from remotely communicating sensors 127.

This configuration enables secure fluid and electric connections between the various elements of the installation, without requiring any infrastructure or any particular additional external protection.

Where necessary, remotely communicating intelligent sensors 127 may be provided for each of the sets of tanks 3 of each modular element. The sensors 127 can communicate with the transmitter 126 and/or directly with the electronic logic 11. For example, such a pressure sensor may be of the type described in document EP1988327 or FR2868160.

The installation makes it possible to build a gas-distribution system having one or more modular elements. This architecture enables flexible adaptation to gas requirements. Furthermore, the arrangement of the modular elements makes it possible to anticipate differences in alignment and level between each of the elements.

The modular elements enable unlimited combinations and reversible usage on either side (left or right).

Preferably, each modular element includes a secure access (for example via breakable glass) to a shut-off valve.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. At least one modular element for distributing pressurized gas comprising a housing containing at least one tank of pressurized gas, the at least one tank having an outlet orifice coupled, via a pressure reducing valve, to a gas distribution circuit, wherein:
   - each modular element includes a cover for the housing;
   - the cover selectively closes an open face of the housing and forms a support for a first gas duct and a second gas duct forming at least part of the gas distribution circuit;
   - the first gas duct has a first free extremity and a second free extremity each fitted with a fluid coupling member;
   - the second gas duct has a first free extremity fitted with a fluid coupling member coupled in a selectively removable manner to an inlet receiving expanded gas from the pressure reducing valve of the at least one tank and a second extremity coupled to the first gas duct, between the first free extremity and the second free extremity of said first gas duct, and
   - the fluid coupling member of the first free extremity of the first gas duct is a male or, respectively, female self-sealing coupling member, and in that the fluid coupling member of the second free extremity of the first gas duct is a female or, respectively, male self-sealing coupling member, mating with the fluid coupling member of the first free extremity of the first gas duct, to enable the coupling of the first free extremity of the first gas duct of a first modular element of the at least one modular element to a second free extremity of a first gas duct of a second modular element and the coupling of the second free extremity of the first gas duct of the first modular element to a first free extremity of a first gas duct of a third modular element of the at least one modular element, so as to form a shared supply line made up of the first gas ducts of each of said at least one modular element connected by the fluid coupling members.

2. The at least one element of claim 1, wherein at least one of the first free extremity of the first gas duct, the second free extremity of the first gas duct and the first free extremity of the second gas duct is flexible to enable a fluid coupling in different positions and over different gaps in relation to the cover.

3. The at least one element of claim 1, wherein the second free extremity of the first gas duct is flexible and is seated in a rigid protective sheath that is assembled movably in relation to the cover.

4. The at least one element of claim 1, wherein the cover has a third duct having a first free extremity including a fluid coupling member and a second extremity coupled fluidically between the first and second free extremities of the first gas duct.

5. The at least one element of claim 1, wherein the outlet orifice of the tank or tanks is linked to an isolating valve arranged in series with the pressure reducing valve, the pressure reducing valve being designed such as to ensure a pressure drop between a pressure of the tank and a pressure threshold as a function of a maximum authorized leakage rate.

6. The at least one element of claim 5, wherein the pressure threshold is between 5 and 25 bar.

7. The at least one element of claim 5, wherein the isolating valve and the pressure reducing valve are seated in a tap common to the tank or tanks of the housing, a pressure outlet of the tap downstream of the pressure reducing valve including a fluid coupling member selectively coupled to the first free extremity of the second gas duct.

8. The at least one element of claim 1, wherein the second gas duct includes a second isolating valve arranged between the first free extremity and the second extremity thereof and a pressure sensor placed between the first free extremity of the first gas duct and said isolating valve.

9. The at least one element of claim 8, wherein:
the cover includes an electronic logic controller linked to the pressure sensor of the second gas duct;
the electronic logic controller also having an electrical cable associated to the first free extremity of the second gas duct and fitted with a sensor to determine the coupled or uncoupled state of this first free extremity of the second gas duct; and
the electronic logic controller being configured to selectively perform a leakage test in which the second isolating valve of the second gas duct is closed, an isolating valve associated to the at least one tank is opened and a pressure measured by the pressure sensor of the second gas duct is compared to a threshold.

10. The at least one element of claim 9, wherein the isolating valve of the second gas duct is a solenoid valve and in that the electronic logic controller is linked to this solenoid valve via a second electrical cable to enable the opening or closing thereof to be controlled selectively.

11. A fuel cell installation comprising a fuel cell coupled to a source of gas fuel containing hydrogen, wherein the source of gas fuel has at least one of the modular elements for distributing gas of claim 1, in which the at least one pressurized gas tank contains the pressurized gas and the second free extremity of the first gas duct is coupled fluidically to a gas inlet of the fuel cell.

12. The installation of claim 11, wherein:
the at least one modular element is coupled in line to supply the fuel cell; and
the first free extremity of the first gas duct of a first of the at least one modular elements is coupled to the second free extremity of the first gas duct of a second of the at least one modular elements that is adjacent to said first of the at least one modular element such that the tanks of the first and second of the at least one modular elements are linked in parallel to the shared supply line formed by the first gas ducts linked by the fluid coupling members.

13. The installation of claim 12, wherein:
the modular elements are placed on a ground on their respective housing; and:
the first free extremity and/or the second free extremity of the first gas duct of each modular element is flexible and/or extendable to enable different orientations, inclines and heights between the fluidically coupled adjacent modular elements.

14. The installation of claim 12, wherein the second free extremity of the first gas duct of the first of said at least one modular element is coupled to the first free extremity of the first gas duct of a third of said at least one modular elements that is adjacent to said first of said at least one modular element such that the tanks of the adjacent the first and third of the at least one modular elements are linked in parallel to the shared supply line formed by the first gas ducts linked by the fluid coupling members.

15. The installation of claim 14, wherein the second free extremity of the first gas duct of the third of the at least one modular element is linked to an end duct fitted with an end part to close the shared supply line.

* * * * *